(12) United States Patent
Vierimaa

(10) Patent No.: US 11,025,754 B2
(45) Date of Patent: *Jun. 1, 2021

(54) SYSTEM FOR PROCESSING MESSAGES OF DATA STREAM

(71) Applicant: MENTOR GRAPHICS CORPORATION, Wilsonville, OR (US)

(72) Inventor: Kari Vierimaa, Kempele (FI)

(73) Assignee: MENTOR GRAPHICS CORPORATION, Wilsonville, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/738,772

(22) Filed: Jan. 9, 2020

(65) Prior Publication Data

US 2020/0220951 A1 Jul. 9, 2020
US 2021/0120106 A9 Apr. 22, 2021

Related U.S. Application Data

(63) Continuation of application No. 15/637,115, filed on Jun. 29, 2017, now Pat. No. 10,574,795.

(30) Foreign Application Priority Data

Jul. 8, 2016 (FI) ..................................... 20165570

(51) Int. Cl.
*H04L 29/06* (2006.01)
*H04L 29/08* (2006.01)
(Continued)

(52) U.S. Cl.
CPC ........ *H04L 69/12* (2013.01); *H04L 29/06027* (2013.01); *H04L 29/06068* (2013.01);
(Continued)

(58) Field of Classification Search
CPC ......... H04L 69/22; H04L 69/10; H04L 69/12; H04L 49/109; H04L 49/65; H04L 49/101
See application file for complete search history.

(56) References Cited

U.S. PATENT DOCUMENTS 5,765,166 A * 6/1998 Gotfried ............... G01S 13/726
707/737
6,219,697 B1 4/2001 Lawande
(Continued)

FOREIGN PATENT DOCUMENTS

CN 101387952 A 3/2009
EP 1827036 A1 8/2007
(Continued)

*Primary Examiner* — Ramy M Osman
(74) *Attorney, Agent, or Firm* — Lempia Summerfield Katz LLC

(57) ABSTRACT

A system for processing messages of a high rate data stream and an apparatus including: a message processor including a plurality of processor sub-modules and configured to read an input data stream, process the input data stream, and to output an output data stream; at least one payload memory storing data related to the input data stream and accessible to the message processor; at least one instruction memory accessible to the message processor and storing computer program instructions configuring the message processor to process the input data stream; and an application processor configured to rewrite the at least one instruction memory.

21 Claims, 7 Drawing Sheets

(51) Int. Cl.
*H04L 12/761* (2013.01)
*H04L 12/933* (2013.01)
*H04L 12/931* (2013.01)

(52) U.S. Cl.
CPC ........ *H04L 29/08144* (2013.01); *H04L 45/16* (2013.01); *H04L 49/101* (2013.01); *H04L 49/109* (2013.01); *H04L 49/65* (2013.01); *H04L 67/1002* (2013.01); *H04L 69/08* (2013.01); *H04L 69/10* (2013.01); *H04L 69/22* (2013.01)

(56) References Cited

U.S. PATENT DOCUMENTS

| | | | |
|---|---|---|---|
| 7,317,733 | B1 | 1/2008 | Olsson |
| 7,814,218 | B1 | 10/2010 | Knee |
| 7,925,860 | B1 * | 4/2011 | Juffa ............... G06F 9/3889 712/10 |
| 8,427,952 | B1 * | 4/2013 | Pearce ............ G06F 9/3889 370/235 |
| 10,382,365 | B2 | 8/2019 | Rayner |
| 10,574,795 | B2 * | 2/2020 | Vierimaa ........... H04L 49/109 |
| 2002/0159389 | A1 | 10/2002 | Foster |
| 2002/0159446 | A1 | 10/2002 | Foster |
| 2004/0169874 | A1 * | 9/2004 | Tone ................. H04N 1/60 358/1.9 |
| 2005/0021874 | A1 | 1/2005 | Georgiou |
| 2005/0081200 | A1 * | 4/2005 | Rutten ............. G06F 9/4881 718/100 |
| 2005/0271059 | A1 | 12/2005 | Young |
| 2009/0080452 | A1 | 3/2009 | Ra |
| 2010/0186087 | A1 * | 7/2010 | Bolton ............. H04N 21/2389 726/22 |
| 2010/0332618 | A1 * | 12/2010 | Norton ............. H04L 69/22 709/219 |
| 2011/0170619 | A1 | 7/2011 | Anvari |
| 2011/0225376 | A1 | 9/2011 | Hasting |
| 2011/0289179 | A1 | 11/2011 | Pekcan |
| 2012/0020250 | A1 | 1/2012 | Sundararaman |
| 2012/0082171 | A1 | 4/2012 | Georgiou |
| 2013/0346639 | A1 | 12/2013 | Stroud |
| 2014/0153575 | A1 | 6/2014 | Munoz |
| 2015/0131643 | A1 | 5/2015 | Oren |
| 2018/0013608 | A1 | 1/2018 | Vierimaa |
| 2020/0220951 | A1 * | 7/2020 | Vierimaa ........... H04L 49/109 |

FOREIGN PATENT DOCUMENTS

| | | |
|---|---|---|
| WO | WO2008092067 A2 | 7/2008 |
| WO | WO2010145187 A1 | 12/2010 |

\* cited by examiner

SYSTEM FOR PROCESSING MESSAGES OF DATA STREAM

PRIORITY

This application is a continuation of U.S. patent application Ser. No. 15/637,115, filed Jun. 29, 2017, which is hereby incorporated by reference in its entirety. This application also claims the benefit of Finnish Patent Application No. 20165570, filed on Jul. 8, 2016, which is also hereby incorporated by reference in its entirety.

TECHNICAL FIELD

The invention relates to message processor of a high data rate streams of digital data.

TECHNICAL BACKGROUND

Modern telecommunication systems include many communication interfaces and communication protocols. New technologies are being designed and old systems are developed, so there are many product generations on the market. Communication protocols are being developed as well and, as a consequence, several protocol versions are applied concurrently.

Therefore, interfacing is very challenging due to the fact that many protocols and systems are in available and in concurrent use. Additionally, some protocol versions may have bugs, errors, or variants. A conventional interface is designed and dedicated to one type of protocol or are fixed to support selected multiple protocols.

A typical protocol message processing block consists of dedicated hardware components and software components. The hardware is typically a limiting part because it is difficult to modify and expand to other interfaces or other protocols. The software part is naturally more flexible, but in this case it is commonly integrated and embedded to the hardware, and it cannot be modified during the operation.

Another challenge is very fast data streams, e.g. over 100 Gigabits per second. This means that the message processing must be very fast in order not to create a bottleneck for the system. Due to that and the fact that a pure software solution on a general purpose processor is not fast enough, a combined hardware and software solution is mostly preferred.

These characteristics of the conventional systems lead to a very complex system if there is requirement of processing messages of multiple protocols, because a dedicated message processing block needs to be provided for each protocol.

An example of an application area of such message processors is mobile network base stations, other wireless network base stations and nodes, IEEE 802.11 (Wi-Fi) systems, datacenters and their data

BRIEF DESCRIPTION

The invention is defined by the independent claim. Embodiments are defined in the dependent claims.

BRIEF DESCRIPTION OF THE DRAWINGS

In the following the invention will be described in greater detail by means of preferred embodiments with reference to the accompanying drawings, in which.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
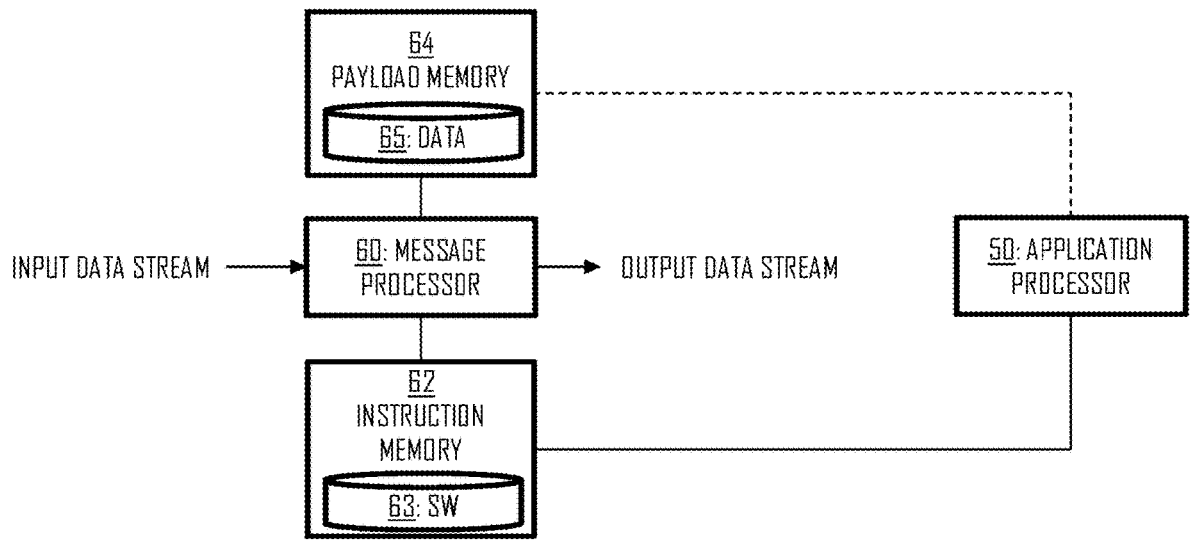
FIG. 1 illustrates a general architecture of a message processing apparatus according to an embodiment of the invention.

FIG. 1 illustrates a general block diagram of an apparatus according to an embodiment of the invention. The apparatus comprises a message processor 60 configured to read an input data stream, process the input data stream, and to output an output data stream. The apparatus further comprises at least one payload memory 64 storing data 65 related to the input data stream and accessible to the message processor 60. The apparatus further comprises at least one instruction memory 62 accessible to the message processor 60 and storing computer program instructions 63 (software) configuring the message processor 60 to process the input data stream. The apparatus further comprises an application processor 50 configured to rewrite the at least one instruction memory 62 while the message processor 60 is processing the input data stream.

The ability to reconfigure the message processor 60 enables support for multiple different communication protocols, wherein the support for the new communication protocol may be configured by the application processor 50. This improves the flexibility of the hardware use. Additionally, the reconfiguration may enable adaptation to various issues or events detected during the message processing, as described below. Reconfiguring the message processor 60 "on-the-fly", i.e. while the message processor is processing the messages, enables fast and efficient reconfiguration with low overhead in terms of system stand-by time during the reconfiguration.

In an embodiment, the application processor 50 has access to the payload memory 64 and to the data 65. This enables the application processor 50 to read the data 65 and to carry out the rewriting of the instruction memory 62 on the basis of the read data. It also enables the application processor to write data to the payload memory such that the message processor 60 may use the written data in the message processing. The access to the instruction memory and the payload memory by the application processor may be arranged such that the access bypasses the message processor 60. Accordingly, the application processor 50 may access the memories without interrupting or disturbing the process of the message processor.

Figure 2:
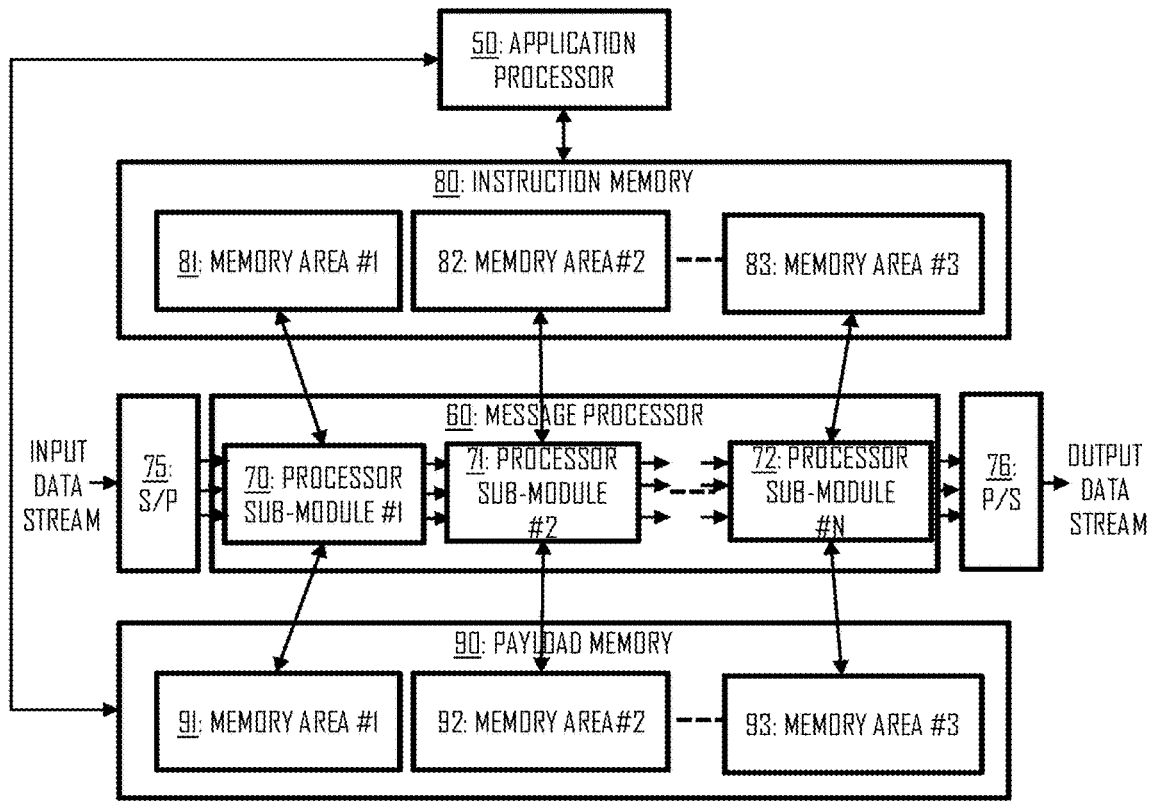
FIG. 2 illustrates an embodiment where a message processor comprises a plurality of processor sub-modules.

FIG. 2 illustrates an embodiment of the apparatus of FIG. 1. In this embodiment, the message processor 60 comprises a plurality of processor sub-modules 70, 71, 72, wherein each processor sub-module is provided with a dedicated memory area 81, 82, 83 in the at least one instruction memory 80. Each processor sub-module 70 to 72 may be configured to perform a dedicated task in the processing of the input data stream. Regarding to the above-described feature of rewriting the instruction memory 62 while the message processor 670 is processing the input data stream, the application processor 50 may be configured to rewrite a memory area 81 of a first processor sub-module 70 while a second processor sub-module 71 is processing the input data stream.

Similarly, each processor sub-module 70 to 72 may have a dedicated memory area 91, 92, 93 in the payload memory 90 to which the processor sub-module uses to data read and/or data write operations, e.g. as a working memory. The application processor 50 may also have access to the payload memory 90 and be configured to read the payload memory, write the payload memory, and/or reconfigure one or more memory areas 81 to 83 on the basis of read contents of the payload memory 90. As illustrated in FIG. 2, the processor sub-modules may be concatenated into a serial form. Accordingly, the input data stream may be input to the first processor sub-module 70 configured by the software in the memory area 81 to perform a first processing task for the input data stream. When the first processor sub-module 70 has completed its task, it may output the result of the processing task to the second processor sub-module 71. The second processor sub-module 72 may be configured by the software in the memory area 82 to perform a second, different processing task for the input data stream and/or for the result of the processing task of the first processor sub-module 70. In this manner, the input data stream and/or processing results of each processor sub-module may be transferred as internal data streams within one or more internal buses of the message processor 60 such that the last processor sub-module 72 in the chain outputs the output data stream that has been processed from the input data stream.

FIG. 2 further illustrates further a serial-to-parallel (S/P) converter 75 and a parallel-to-serial (P/S) converter 76. The data is typically in a serial format in one or more data buses when received. The S/P converter 75 may be configured to transform the serial data into a parallel form and output parallel data streams to the message processor. In an embodiment, each parallel data stream is input into a different processor sub-module 70 to 72 such that the number of parallel data streams may be equal to the number of processor sub-modules. Accordingly, the processor sub-modules may all be parallel with respect to each other. In another embodiment, the number of parallel data streams is smaller than the number of processor sub-blocks. Accordingly, some of the processor sub-blocks may be in parallel and some concatenated with at least one other processor sub-module. The P/S converter 76 receives output data streams from one or more processor sub-modules in a parallel form and converts the parallel data streams into a serial data stream. Each parallel data stream may employ a word length of 24, 32, 64, 128, 256, or more bits. Correspondingly, the P/S part makes a procedure that is inverse to the procedure performed by the S/P converter 75 and transforms the parallel data streams into a single serial data stream.

In an embodiment, the processor sub-modules may perform the processing of the parallel data streams simultaneously as parallel or at least partially parallel processing. The division of a single stream into a parallel form enables separating the processing tasks to different modules and carrying out multiple processing tasks in parallel. This enables efficient processing of high-data-rate streams.

In some contexts, the S/P converter 75 may be called a deserialization (DES) block, and the P/S converter may be called a serialization block (SER). In an embodiment, the converters 75, 76 may be provided in a single physical block, e.g. a single processor or processing circuitry.

In an embodiment more than one serial-to-parallel (S/P) converters 75 are provided such that the S/P converters together transform serial data into a parallel form and output the parallel data streams to the multiple processor sub-modules. A S/P converter may output a subset of parallel data streams to a subset of processor sub-modules, and different S/P converters may output parallel data streams to different processor sub-modules. Similarly, more than one parallel-to-serial (P/S) converters 76 may be provided such that the P/S converters transform parallel data streams acquired multiple processor sub modules into serial data streams, and the serial data streams output by the multiple P/S converters are combined and output to a bus.

In an embodiment, the message processor 60 performs a format conversion from one communication protocol to another communication protocol.

For that purpose, let us assume a message processor with eight processor sub-modules #1 to #8 concatenated in the increasing order of #N. Processor sub-module #1 is configured to read a selected data block from a serial data string in the format of protocol 1 and to store the data of the data block to payload memory block SINK A (not shown in Figures). The next processor sub-module #2 is configured to read a selected data block from the serial data string in the format of protocol 1 and to store the data of the data block to a payload memory block SINK B. The following processor sub-module #3 is configured to read a selected data block from the serial data string in the format of protocol 1 and to store the data of the data block to memory block SINK C. The following processor sub-module #4 is not having any special function in this application, so it may transfer data to the next processor sub-module #5. The processor sub-module #5 is configured to form a frame for a message in protocol 2. The following processor sub-module #6 is configured to write data from the payload memory block SINK A to a selected field in the frame in the format of protocol 2. The following processor sub-module #7 is configured to write data from the payload memory block SINK B to a selected field in the frame in the format of protocol 2. The following processor sub-module #8 is configured to write data from the payload memory block SINK C to a selected field in the frame in the format of protocol 2.

In another embodiment, the message processor 60 performs one or more test functions for the input data stream, e.g. performs conformance testing to test whether or not the received input data stream conforms to a communication protocol. Let us again consider an example with eight concatenated processor sub-module #1 to #8 as in the previous example. Processor sub-module #1 is configured to do decrypting of a serial input data string. The following processor sub-module #2 is configured to read a selected data block (data 1) from the serial data string and store the data to payload memory block SINK A. The following processor sub-module #3 is configured to get a new test vector data part A. The following processor sub-module #4 is configured to get a new test vector data part B. The following processor sub-module #5 is configured to get a new test vector data part C. The following processor sub-module #6 is configured to form a frame for a new data string. The following processor sub-module #7 is configured to test the stored data in payload memory block SINK A. If the testing is successful, following processor sub-module #8 is configured to make a data string from the test vector data parts A, B, and C and to encrypt the data string. In another embodiment, at least some of the processing may be carried out in a different order, e.g. the order of the processor sub-modules may be switched. If the testing is not successful, the processor sub-module #8 may be configured to perform another task. Accordingly, the application processor may wait until the testing is completed before determining the configuration of the processor sub-module #8. Let us bear in mind that the message processor 60 may process a data stream which means that the processor sub-module #8 may still perform a task related to a previous input data string while the processor sub-module #7 is performing the testing of the current input data string. In this manner, there is minimal idle time in each processor sub-module.

In an embodiment, the processor structure of FIG. 1 or 2 may be realized by using a 8051 processor architecture with an enhanced instructions set as a basis.

In an embodiment, fast rewriting of the instruction memory 62, 80 may be realized by using scatter-gather direct memory access (SG-DMA). Typically, a SG-DMA realization is dedicated to do only one operation or a function. It is due to the fact that its instruction memory is a fixed structure, for example a logic circuitry, which cannot be preprogrammed at least during the processing. The application processor 50 may, however, comprise an SG-DMA entity configured to carry out the rewriting of the instruction memory 62, 80.

Figure 3:
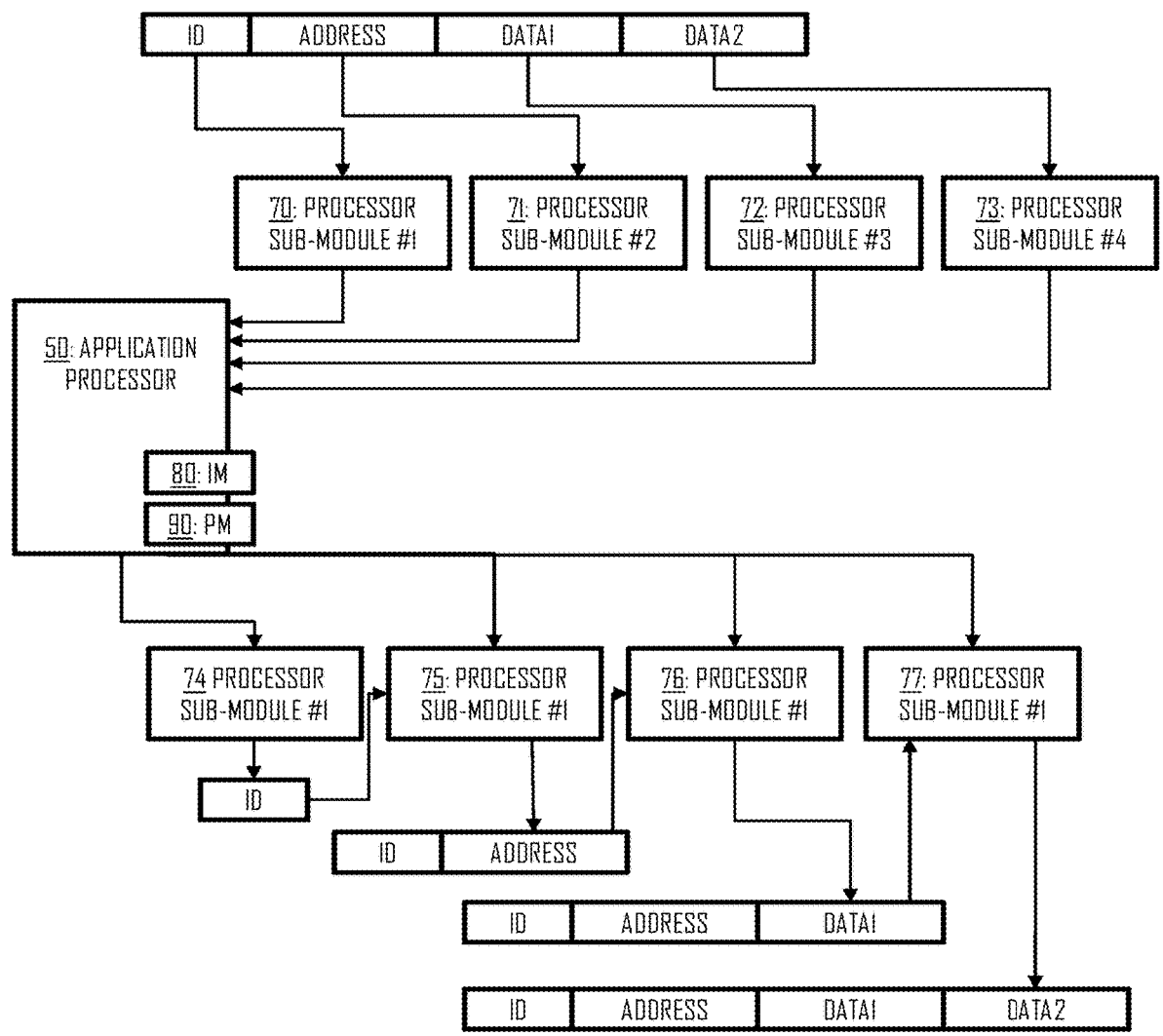
FIGS. 3 to 5 illustrate different embodiments of an architecture of the message processing apparatus of FIG. 1.
Figure 4:
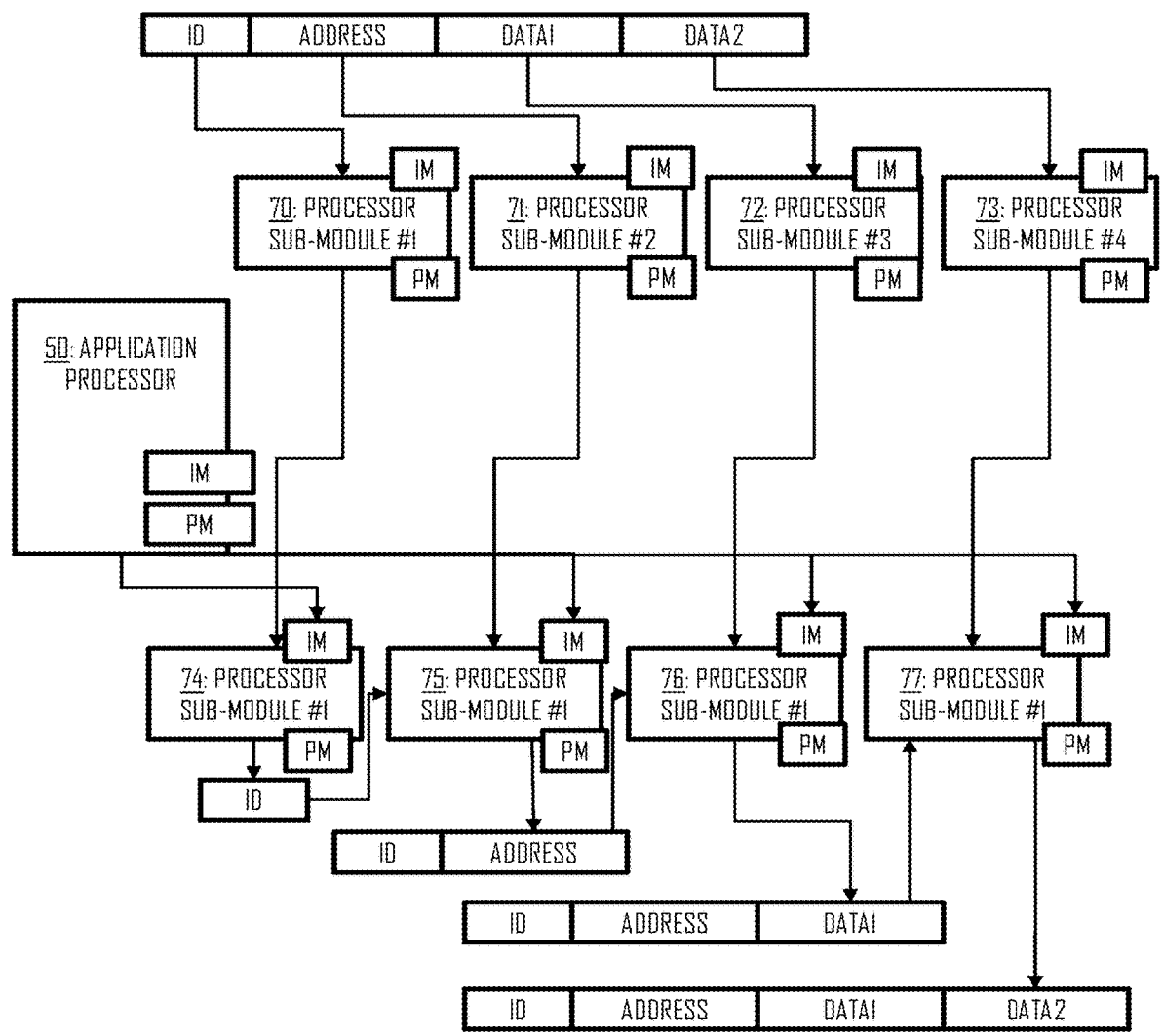
Figure 5:
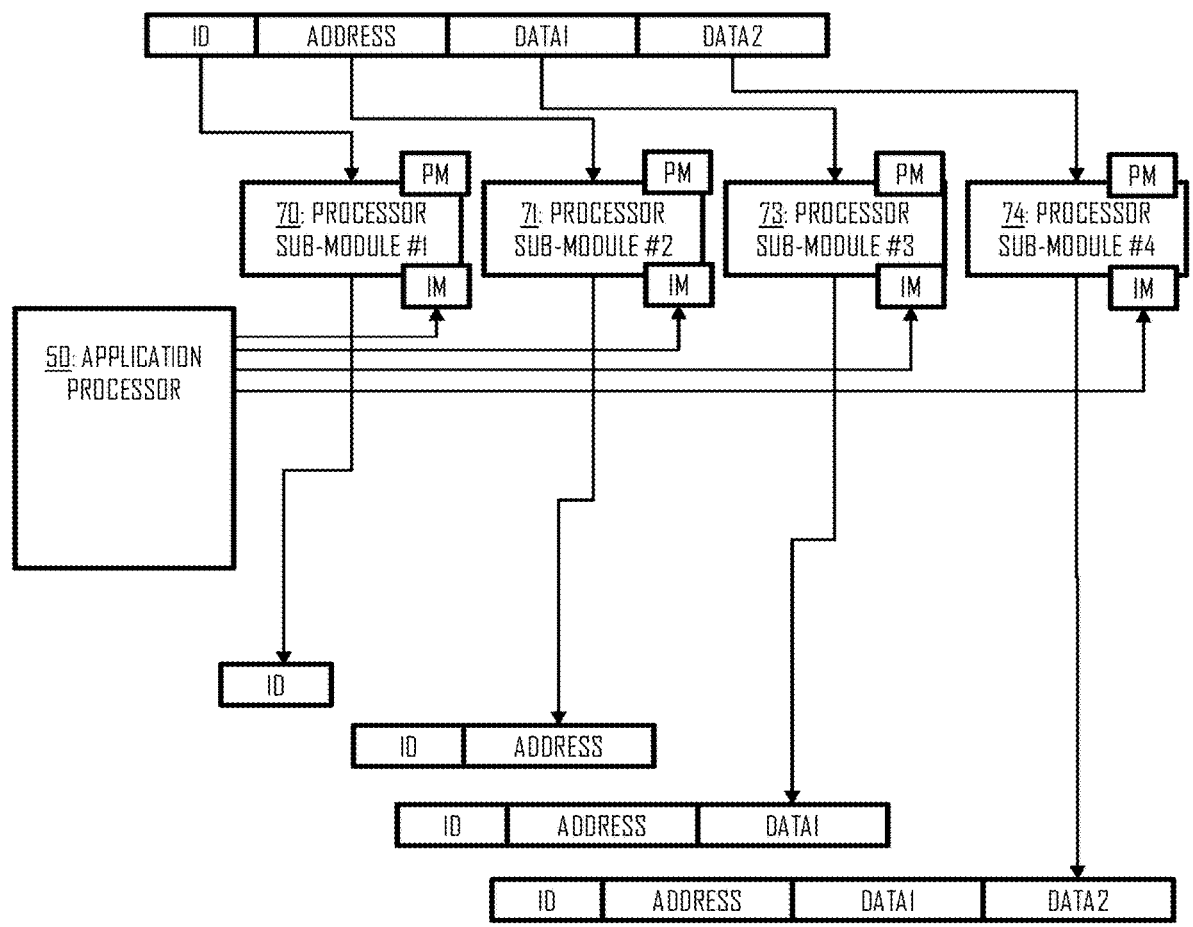

Let us now describe some embodiments of the architectures of the apparatus with reference to FIGS. 3 to 5. The function of the apparatus is in this context protocol translation where the apparatus translates a frame received in a first communication protocol format into a frame of a second communication protocol format. In an embodiment, the first communication protocol format is open base station architecture initiative (OBSAI) reference point 3 (RP3) and the second communication protocol format is common public radio interface (CPRI). In another embodiment, the first communication protocol format is the CPRI and the second communication protocol format is the OBSAI RP3. In another embodiment, the conversion is made between CPRI and Ethernet.

In the examples of FIG. 3 to 5, the message processor comprises eight processor sub-modules, but the number may be different depending on the application. In the embodiment of FIG. 3, the instruction memory 80 and the payload memory 90 are embedded in the application processor but each processor sub-module may have a memory access to the memories 80, 90, e.g. via a dedicated memory bus.

Referring to FIG. 3, the input data stream may comprise a frame in the first communication protocol. FIG. 3 illustrates a simplified frame comprising a frame identifier (ID) indicating a structure of the frame, an access address comprising an address of at least a receiver of the frame, and two data fields DATA1 and DATA2. A processor sub-module 70 is configured to read its instructions set from the instruction memory 80, wherein the instructions set configures the processor sub-module 70 to read the frame identifier of the frame and output the frame identifier to the payload memory 90. A processor sub-module 71 is configured to read its instructions set from the instruction memory 80, wherein the instructions set configures the processor sub-module 71 to read the address of the frame and output the address to the payload memory 90. A processor sub-module 72 is configured to read its instructions set from the instruction memory 80, wherein the instructions set configures the processor sub-module 72 to read the DATA1 field of the frame and output the contents of the DATA1 field to the payload memory 90. A processor sub-module 73 is configured to read its instructions set from the instruction memory 80, wherein the instructions set configures the processor sub-module 73 to read the DATA2 field of the frame and output the contents of the DATA2 field to the payload memory 90. Upon the processor sub-modules 70 to 73 have performed their tasks, the contents of the frame have been extracted from the protocol format of the first communication protocol and stored in the payload memory 90. Thereafter, the reformatting proceeds to the generation of a new frame in the format of the second communication protocol in the processor sub-modules 74 to 77.

The application processor may determine the configuration of the processor sub-modules 74 to 77 upon reading the contents of the extracted frame in the payload memory 90. For example, whether or not a CRC (cyclic redundancy check) of the extracted frame has failed, the application processor may determine different configurations for the processor sub-modules 74 to 77.

Regarding the generation of the new frame, the application processor may configure the processor sub-module 74 to read the frame identifier from the payload memory 90, to convert the frame identifier into a format of the second communication protocol, and to output the frame identifier to the processor sub-module 75. The application processor may configure the processor sub-module 75 to receive the frame identifier, to read the address from the payload memory 90, to convert the address into a format of the second communication protocol, to insert the address into an address field after the identifier, and to output the frame identifier together with the address field to the processor sub-module 76. The application processor may configure the processor sub-module 76 to receive the frame identifier and the address field, to read the data of the data field DATA1 from the payload memory 90, to convert the data DATA1 into a format of the second communication protocol, to insert the converted data into a data field after the address field, and to output the frame identifier together with the address field and the data field to the processor sub-module 77. The application processor may configure the processor sub-module 77 to receive the frame identifier, the address field, and the data field, to read the data of the data field DATA2 from the payload memory 90, to convert the data DATA2 into a format of the second communication protocol, to insert the converted data into a second data field after the data field, and to output the frame identifier together with the address field and the data fields as an output frame.

The application processor may determine the configurations of the processor sub-modules on the basis of the translation task, e.g. depending on the communication protocol of the input frame and the communication protocol of the output frame.

In an embodiment, a subset of processor sub-modules may be configured to perform only reading as the processor sub-modules 70 to 73 in the embodiment of FIG. 3, while another subset of processor sub-modules may be configured to perform only writing as the processor sub-modules 74 to 77 in the embodiment of FIG. 3.

In an embodiment, each processor sub-module is configured to process a single field of the data frame. In another embodiment, a processor sub-module is configured to process multiple fields, e.g. the whole preamble of the input/ output data frame or a subset of more than one data fields of the preamble. For example, the processor sub-module may be configured to compute a CRC checksum of the preamble or the while data frame and output the checksum to the payload memory. On the basis of the value of the checksum, the processor sub-module or another processor sub-module may be configured to perform a certain task.

FIG. 4 illustrates an embodiment where the instruction memory and the payload memory is distributed such that each processor sub-module is provided with its own embedded instruction memory and payload memory. The application processor 50 may further have an embedded instruction module and payload module. In this embodiment, the application processor may configure the inter-connections between the sub-modules in a different manner. For example, the processor sub-modules configured to process the same field of the data frame being converted may be connected to one another, as illustrated in FIG. 4. The processor sub-modules 70 and 74 processing the frame identifier may be inter-connected such that the processor sub-module 70 is configured to extract the frame identifier from the input data frame and to output the extracted frame identifier to the processor sub-module 74, while the processor sub-module 74 is configured to write the frame identifier into the output data frame according to the second communication protocol. Similarly, the processor sub-modules 71 and 75 processing the address field may be inter-connected such that the processor sub-module 71 is configured to extract the address from the address field of the input data frame and to output the extracted address to the processor sub-module 75, while the processor sub-module 75 is configured to write the address into the address field of the output data frame according to the second communication protocol. Similarly, the processor sub-modules 72 and 76 processing the first data field DATA1 may be inter-connected such that the processor sub-module 72 is configured to extract the data from the data field DATA1 of the input data frame and to output the extracted data to the processor sub-module 76, while the processor sub-module 76 is configured to write the data into the data field DATA1 of the output data frame according to the second communication protocol. Similarly, the processor sub-modules 73 and 77 processing the second data field DATA2 may be inter-connected such that the processor sub-module 73 is configured to extract the data from the data field DATA2 of the input data frame and to output the extracted data to the processor sub-module 77, while the processor sub-module 77 is configured to write the data into the data field DATA2 of the output data frame according to the second communication protocol.

The processing order of the output data frame in the processor sub-modules 74 to 77 may be similar to what is described above in connection with FIG. 3. When the processor sub-module 74 has completed the task of writing the frame identifier, it may output the frame identifier to the processor sub-module 75 for the insertion of the address field. When the processor sub-module 75 has completed the task of writing the address field, it may output the frame identifier and the address field to the processor sub-module 76 for the insertion of the data field DATA1. When the processor sub-module 75 has completed the task of writing the data field DATA1, it may output the frame identifier, address field, and the data field DATA1 to the processor sub-module 77 for the insertion of the data field DATA2.

In the embodiment of FIG. 4, each processor 50, 70 to 77 has a dedicated instructions memory (IM) and the payload memory (PM). The IM may define a task list for each processor or processor sub-module, including the application processor 50. The PM may contain the payload data processed according to the task list. The task list of the application processor may comprise reading the PMs of the processor sub-modules 70 to 77, and writing IMs (task lists) of the processor sub-modules 70 to 77 dynamically.

FIG. 5 illustrates an embodiment where the payload memory and the instruction memory is provided only as embedded into the processor sub-modules. In this embodiment, the application processor may access the memories to read the data and/or to rewrite the instructions. Otherwise, the operation may be similar to the embodiment of FIG. 4.

In an embodiment, at least one processor sub-module may be configured to test the input data frame and/or the output data frame. The present invention also allows pinpointing of a processor sub-module that performs erroneously in a case where the testing results in a detection of an error. For example, upon detecting an error in the output data frame, the application processor may sequentially test outputs of the processor sub-modules generating the fields of the frame in order to detect the processor sub-module that generates the error.

Technical effects of the above-described embodiments include: creating or converting messages of a very fast data stream; any processor sub-module can be programmed separately; a processor sub-module can be modified/programmed although a part of message is already completed; a processor sub-module can be modified/programmed although the processor sub-module processing; a processor sub-module can be modified/programmed in parallel with respect to another processor sub-module; and update or change a module configured to process a certain message part without a need to change the whole system.

Figure 6:
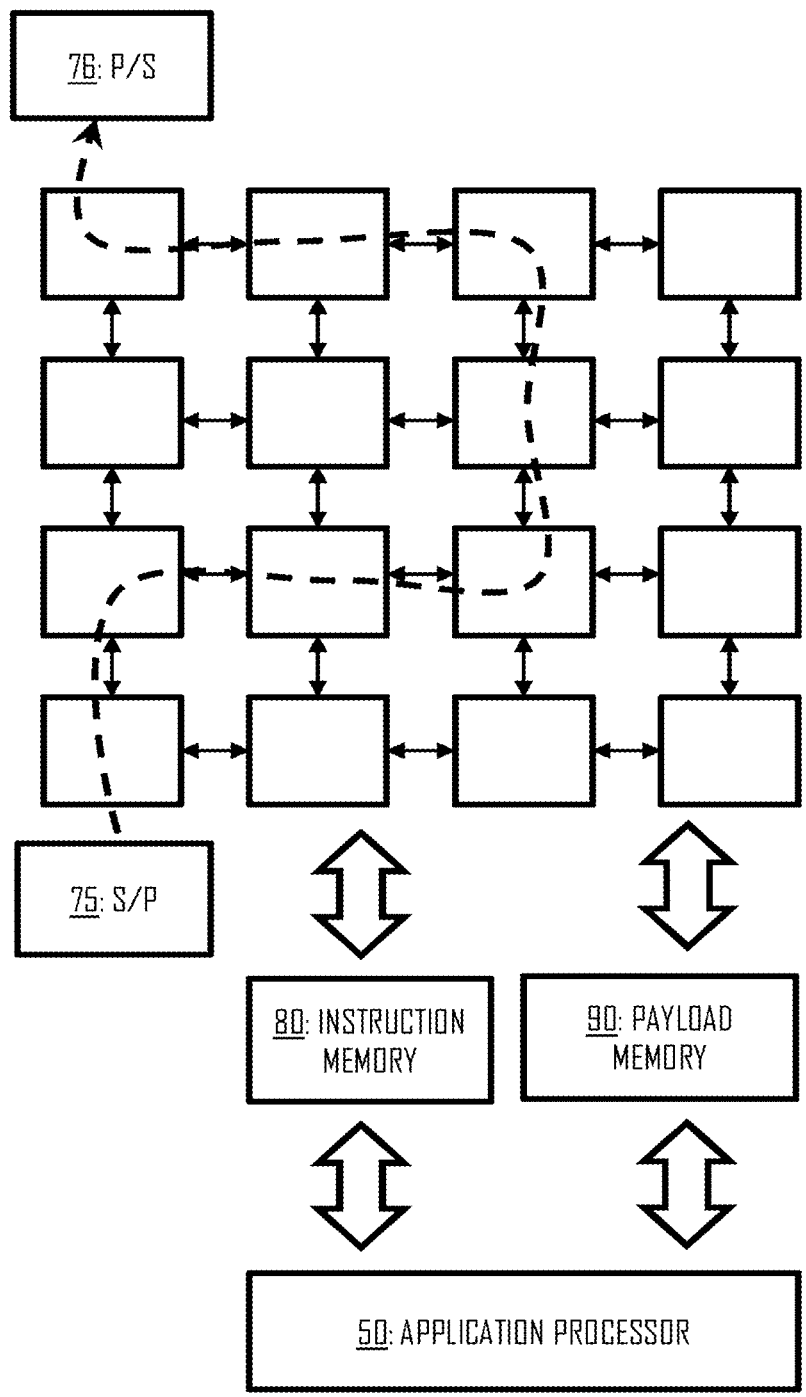
FIGS. 6 to 8 illustrate some embodiment where a message processor comprises a plurality of processor sub-modules in an array form.

FIG. 6 illustrates an embodiment where the plurality of processor sub-modules are arranged in an array, and wherein the application processor 50 is configured to arrange the processor sub-modules of the array into the serial form for the processing of the input data stream. In other words, the application processor 50 may select a suitable processing path through the processor sub-modules of the array. The selected processing path is illustrated in FIG. 6 by the dashed line.

Figure 7:
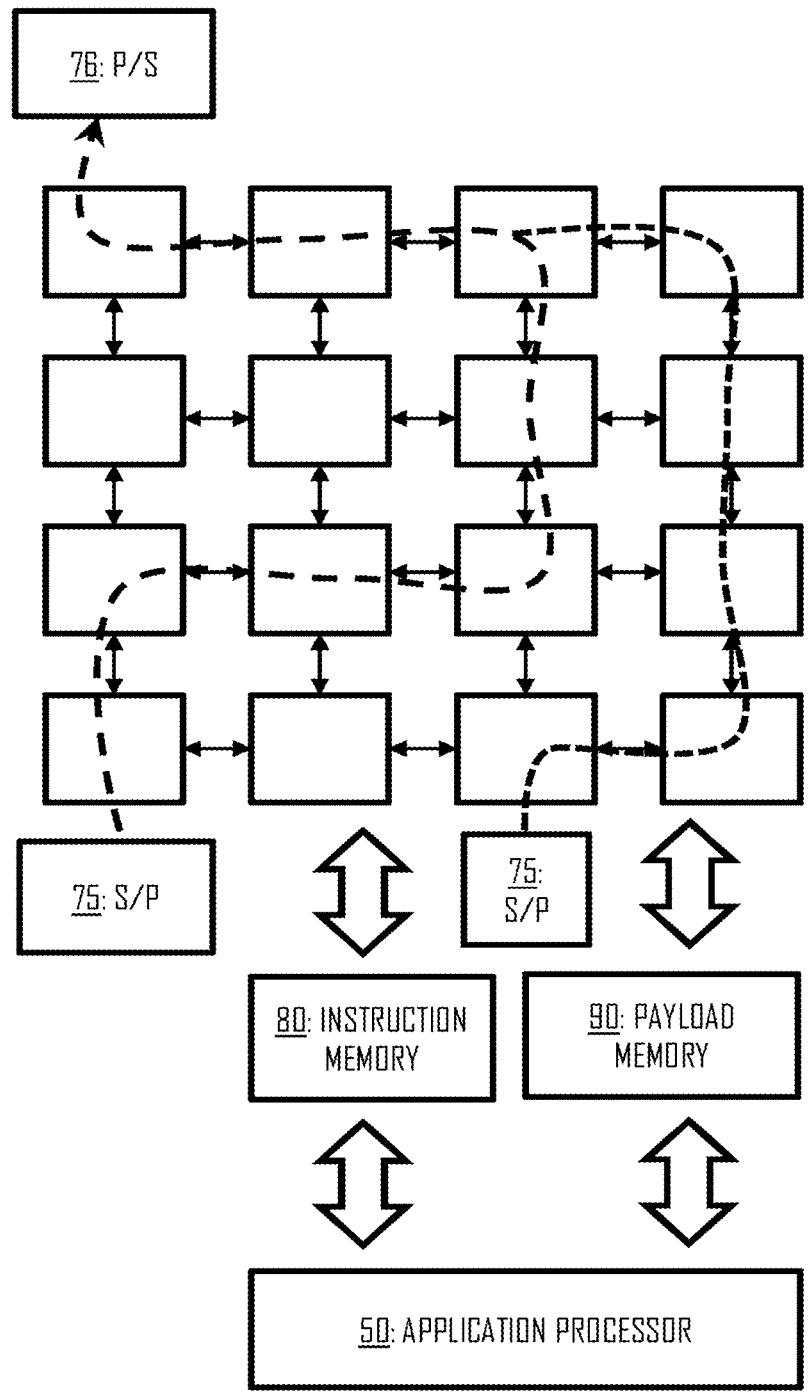

In the embodiment of FIG. 6, the processing path is a single path meaning that the processing is carried out in a serial form. FIG. 7 illustrates another embodiment where the processing in the processor sub-modules is carried out partially in a serial form. Parallel input data streams may be input from the S/P converter 75 into different processor sub-modules that may carry out parallel processing. Each parallel data stream may travel a different route from one processor sub-module to another until the parallel data streams may be combined in a determined processor sub-module, e.g. before the P/S converter 76. In another embodiment, the parallel data streams may travel different routes amongst the processor sub-modules without ever being combined until in the P/S converter 76.

Figure 8:
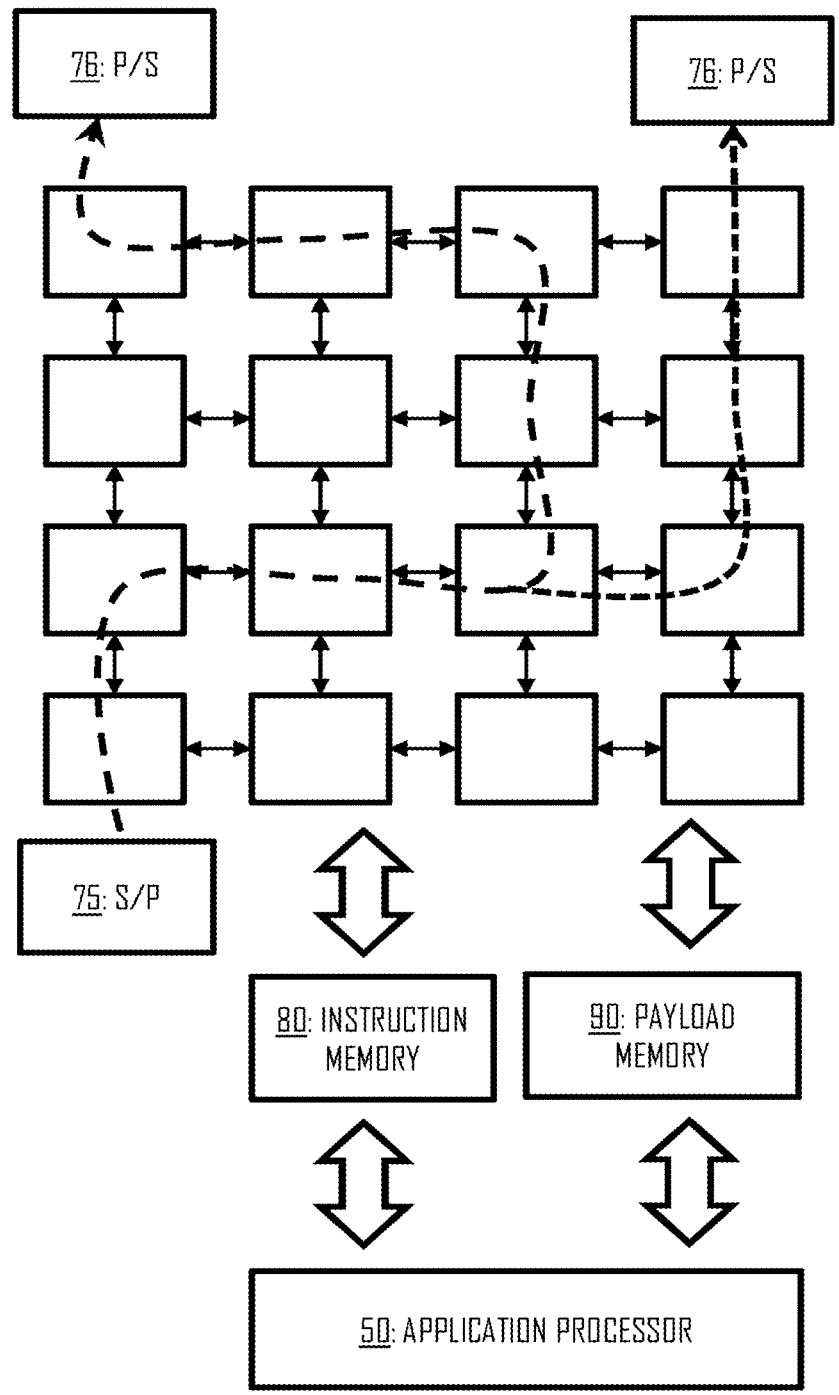

FIG. 8 illustrates an embodiment where a data stream, e.g. one of the parallel data streams is split or divided into two separate data streams in a processor sub-module. A first data stream may be output to one processor sub-module and a second data stream may be output to another processor sub-module. Thereafter, the first and second data streams are routed via different paths amongst the processor sub-modules until being combined in a processor sub-module or in the P/S converter 76, as illustrated in FIG. 8 by outputting the data streams in parallel from the array of processor sub-modules.

The processor sub-modules may comprise a first subset of processor sub-modules and at least a second subset of processor sub-modules, wherein processor sub-modules belonging to different subsets have different performance capabilities, and wherein the application processor is configured to arrange the processor sub-modules of the array into the serial form on the basis of the performance capabilities associated with the first subset and the at least second subset. For example, different processor sub-modules may comprise different hardware and, thus, have different capabilities of performing certain tasks. Appropriate selection of the series of the processor sub-modules according to their strengths enables optimization of the performance for various message processing tasks. The implementation of the instruction memory 80 and the payload memory 90 may be arranged according to any one of the above-described embodiments. Each processor sub-module may have a signal path to neighbouring processor sub-modules in the array. The application processor 50 may carry out the selection of the series of processor sub-modules by configuring an input and an output of each processor sub-module to the instruction memories of the processor sub-modules. Accordingly, each processor sub-module involved in the series and having a processing task is provided with the knowledge of an input signal path from which to receive input data and an output signal path to which output data after processing the input data.

As used in this application, the term "processor" may refer to an electronic device implemented by any of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of "processor" applies to all uses of this term in this application. As a further example, as used in this application, the term "processor" would also cover an implementation of merely a processor (or multiple processors) or portion of a processor, e.g. one core of a multi-core processor, and its (or their) accompanying software and/or firmware. The term "processor" would also cover, for example and if applicable to the particular element, an application-specific integrated circuit (ASIC), and/or a field-programmable grid array (FPGA) circuit for the apparatus according to an embodiment of the invention.

The processes or methods described in FIGS. 4 to 7 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to testing scenarios defined above but also to other suitable testing scenarios. The protocols and the specifications of wireless systems and their base stations develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

I claim:

1. An apparatus comprising:
a message processor comprising a plurality of processor sub-modules in an array form, the message processor being configured to read an input data stream, process the input data stream, and to output an output data stream;
at least one payload memory configured to store data related to the input data stream, the at least one payload memory being accessible to the message processor; and
at least one instruction memory accessible to the message processor, wherein the at least one instruction memory stores computer program instructions executable by the message processor to process the input data stream,
wherein a processing path through a subset of processor sub-modules of the plurality of processor sub-modules of the array is selectable by arrangement of the processor sub-modules of the subset in a serial form,
wherein each processor sub-module of the subset of processor sub-modules includes a dedicated memory area in the at least one instruction memory and is configured to perform a dedicated task in the processing of the input data stream, and
wherein a memory area of the at least one instruction memory that is dedicated to a first processor sub-module of the subset of processor sub-modules is rewriteable while a second processor sub-module of the subset of processor sub-modules is processing the input data stream according to the processing path.

2. The apparatus of claim 1, wherein each processor sub-module of the plurality of processor sub-modules that is involved in the serial form and has a respective dedicated processing task is provided with knowledge of an input signal path from which to receive input data from a first neighboring processor sub-module of the plurality of processor sub-modules and an output signal path to which output data to a second neighboring processor sub-module of the plurality of processor sub-modules after processing the input data.

3. The apparatus of claim 1, wherein the memory area of the instruction memory of the at least one instruction memory that is dedicated to the first processor sub-module is rewriteable based on the data read from the at least one payload memory.

4. The apparatus of claim 1, wherein the data is written to the at least one payload memory such that the message processor uses the written data to process the input data stream.

5. The apparatus of claim 1, wherein the input data stream, processing results of each processor sub-module of the subset, or a combination thereof is transferable as internal data streams within one or more internal buses of the message processor such that a last processor sub-module of the subset is configured to output the output data stream that has been processed from the input data stream.

6. The apparatus of claim 1, further comprising a serial to parallel converter configured to:

transform the input data stream from a serial form into a parallel form; and output parallel data streams to the message processor.

7. The apparatus of claim 6, wherein each parallel data stream of the parallel data streams is inputtable into a different processor sub-module of the plurality of processor sub-modules such that the number of parallel data streams is equal to the number of processor sub-modules.

8. The apparatus of claim 6, wherein each parallel data stream of the parallel data streams is inputtable into a different processor sub-module of the plurality of processor sub-modules such that the number of parallel data streams is smaller than the number of processor sub-modules.

9. The apparatus of claim 6, wherein each parallel data stream of the parallel data streams travels a different route from one processor sub-module of the plurality of processor sub-modules to another processor sub-module of the plurality of processor sub-modules until the parallel data streams are combined.

10. The apparatus of claim 1, wherein the plurality of processor sub-modules are concatenated into the serial form.

11. The apparatus of claim 10, wherein the plurality of processor sub-modules comprises a first subset of processor sub-modules and at least a second subset of processor sub-modules,
wherein processor sub-modules belonging to different subsets have different performance capabilities, and
wherein the plurality of processor sub-modules of the array are arrangeable into the serial form based on the performance capabilities associated with at least the first subset of processor sub-modules and the second subset of processor sub-modules, respectively.

12. The apparatus of claim 1, wherein each processor sub-module of the plurality of processor sub-modules is configured to process only a designated field of a protocol message of the input data stream, and
wherein the designated field is specified in the dedicated memory area of the respective processor sub-module.

13. The apparatus of claim 12, wherein each processor sub-module of the plurality of processor sub-modules is configured to translate the designated field from a first protocol format into a second protocol format.

14. The apparatus of claim 12, wherein each processor sub-module of the plurality of processor sub-modules is configured to perform testing of the designated field.

15. The apparatus of claim 1, wherein the processing path is a single path such that the plurality of processor sub-modules are configured to process at least partially in a serial form.

16. An apparatus comprising:
a message processor comprising a plurality of processor sub-modules, the message processor being configured to:
read an input parallel data stream;
process the input parallel data stream; and
output an output data stream, wherein processing in the plurality of processor sub-modules is carried out in parallel;
at least one payload memory configured to store data related to the input parallel data stream, the at least one payload memory being accessible to the message processor; and
at least one instruction memory accessible to the message processor, the at least one instruction memory being configured to store computer program instructions executable by the message processor to process the input parallel data stream,
wherein each processor sub-module of the plurality of processor sub-modules includes a dedicated memory area in the at least one instruction memory, the respective processor sub-module being configured to perform a dedicated task in the processing of the input parallel data stream,
wherein the input parallel data stream is divided into a first data stream and a second data stream,
wherein the first data stream is outputable to a first processor sub-module of the plurality of processor sub-modules, and the second data stream is outputable to a second processor sub-module of the plurality of processor sub-modules,
wherein the first data stream and the second data stream are routed via different processing paths through the plurality of processor sub-modules until being combined, and
wherein a memory area of the at least one instruction memory that is dedicated to the first processor sub-module is rewriteable while the second processor sub-module is processing the input parallel data stream according to the different processing paths.

17. The apparatus of claim 16, further comprising a parallel to serial converter configured to combine the first data stream and the second data stream.

18. The apparatus of claim 16, wherein the plurality of processor sub-modules are configured to combine the first data stream and the second data stream.

19. The apparatus of claim 16, wherein the plurality of processor sub-modules are configured to output the first data stream and the second data stream in parallel.

20. A method comprising:
reading, by a message processor comprising a plurality of processor sub-modules in an array form, an input data stream;
processing, by the message processor, the input data stream;
outputting, by the message processor, an output data stream;
storing, by at least one payload memory accessible to the message processor, data related to the input data stream;
storing, by at least one instruction memory accessible to the message processor, computer program instructions executable by the message processor to process the input data stream, wherein each processor sub-module of a subset of processor sub-modules of the plurality of processor sub-modules includes a dedicated memory area in the at least one instruction memory, the respective processor sub-module being configured to perform a dedicated task in the processing of the input data stream;
selecting a processing path through the subset of processor sub-modules of the array, the selecting of the processing path comprising arranging the processor sub-modules of the subset in a serial form; and
rewriting a memory area of the at least one instruction memory that is dedicated to a first processor sub-module of the subset of processor sub-modules while a second processor sub-module of the subset of processor sub-modules is processing the input data stream according to the processing path.

21. A method comprising:
reading, by a message processor comprising a plurality of processor sub-modules in an array form, an input parallel data stream, wherein processing in the plurality of processor sub-modules is carried out in parallel;

processing, by the message processor, the input parallel data stream;

outputting, by the message processor, an output data stream;

storing, by at least one payload memory accessible to the message processor, data related to the input parallel data stream;

storing, by at least one instruction memory accessible to the message processor, computer program instructions executable by the message processor to process the input parallel data stream, wherein each processor sub-module of the plurality of processor sub-modules includes a dedicated memory area in the at least one instruction memory, the respective processor sub-module being configured to perform a dedicated task in the processing of the input parallel data stream;

dividing the input parallel data stream into a first data stream and a second data stream;

outputting the first data stream to a first processor sub-module of the plurality of processor sub-modules;

outputting the second data stream to a second processor sub-module of the plurality of processor sub-modules, wherein the first data stream and the second data stream are routed via different processing paths through the plurality of processor sub-modules until being combined; and rewriting a memory area of the at least one instruction memory that is dedicated to the first processor sub-module while the second processor sub-module is processing the input parallel data stream according to the different processing paths.

* * * * *